W. J. STOKES.
HARROW.
APPLICATION FILED JULY 8, 1913.

1,089,285. Patented Mar. 3, 1914.
2 SHEETS—SHEET 1.

Witnesses

Inventor
W. J. Stokes,
By Victor J. Evans
Attorney

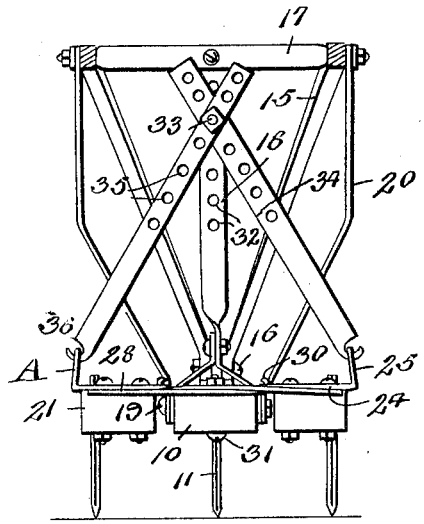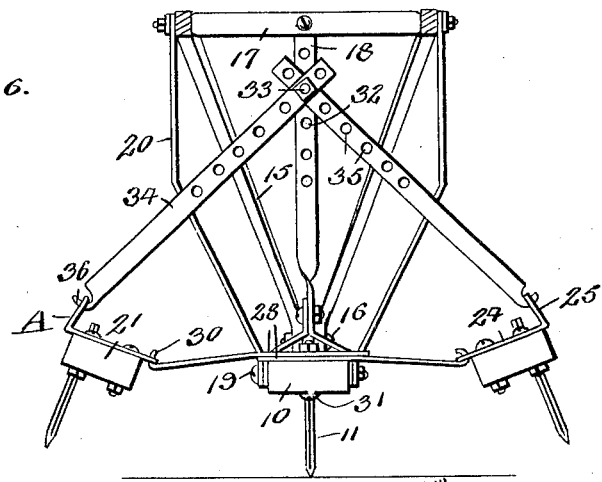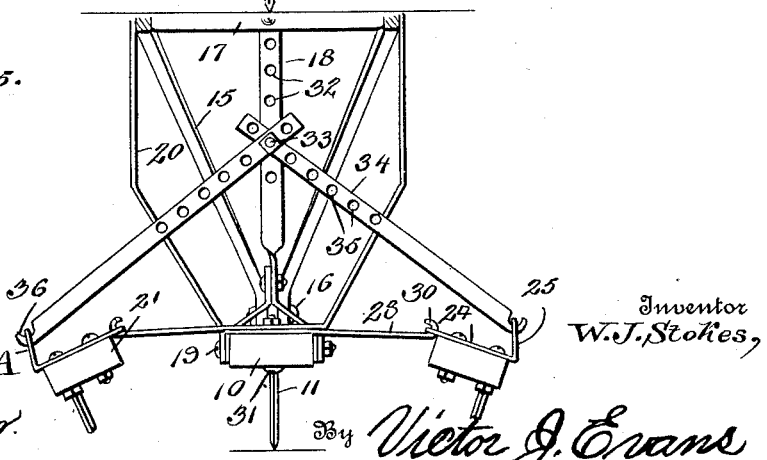

UNITED STATES PATENT OFFICE.

WILLIAM J. STOKES, OF CRYSTAL SPRINGS, MISSISSIPPI.

HARROW.

1,089,285.

Specification of Letters Patent.

Patented Mar. 3, 1914.

Application filed July 8, 1913. Serial No. 777,886.

*To all whom it may concern:*

Be it known that I, WILLIAM J. STOKES, a citizen of the United States, residing at Crystal Springs, in the county of Copiah and State of Mississippi, have invented new and useful Improvements in Harrows, of which the following is a specification.

This invention relates to harrows, and it has particular reference to that class of harrows in which a centrally disposed tooth carrying bar serves to support two adjustable wings or bars which may be expanded or folded with respect to the center bar so as to adapt the harrow for use under various conditions.

The present invention has for its object to so connect the adjustable wings of the center bar as to enable them to be not only spread laterally but also to be tilted in various directions.

A further object of the invention is to simplify and improve the means for connecting the adjustable wings with the center bar.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 1:
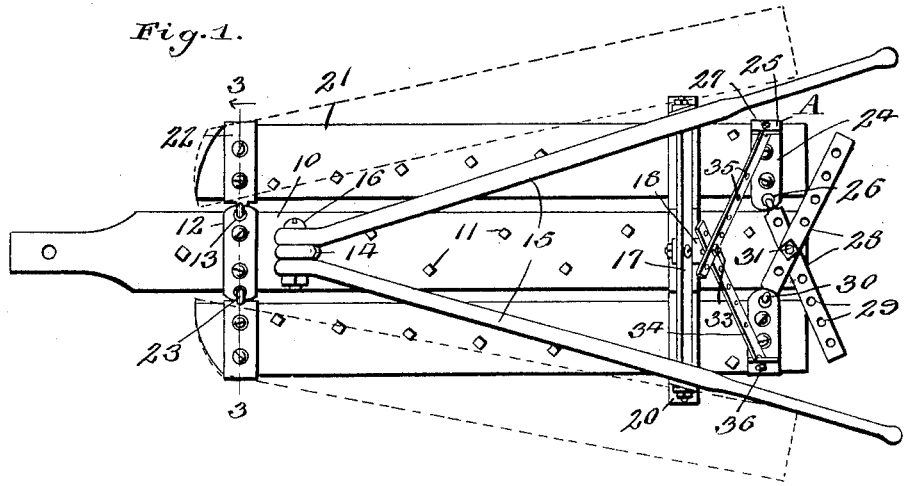
Figure 2:
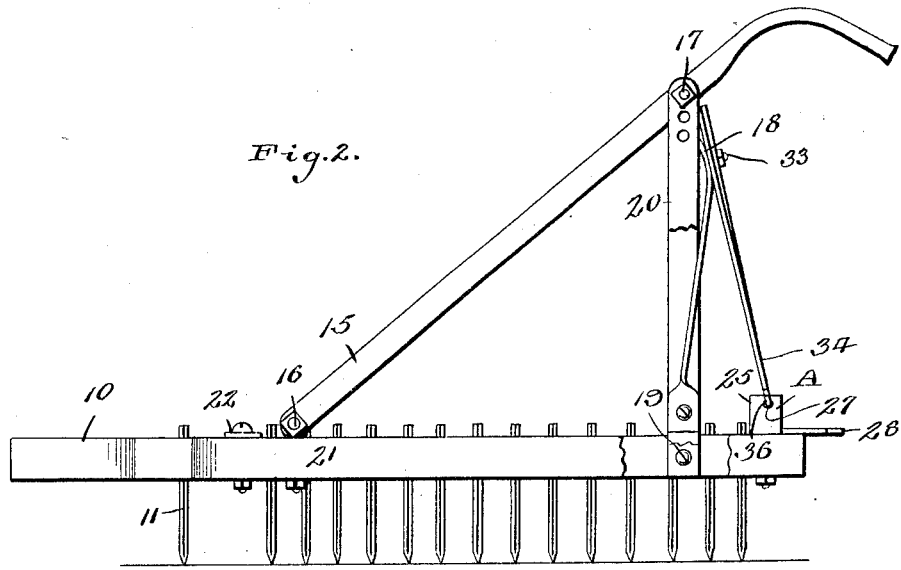
Figure 3:
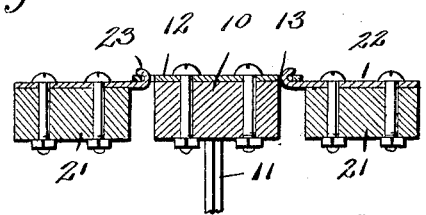

In the drawings,—Figure 1 is a top plan view showing the improved harrow collapsed, dotted lines being used to indicate the position of the wings when spread apart. Fig. 2 is a side elevation partly in section. Fig. 3 is a vertical sectional view taken through the front part of the center bar and the wings on the line 3—3 in Fig. 1. Fig. 4 is a rear elevation showing the harrow collapsed. Fig. 5 is a rear elevation showing the harrow with the wings spread or expanded and also with their outer edges tilted downward. Fig. 6 is a view similar to Fig. 5, but showing the outer edges of the wings tilted upward.

Corresponding parts in the several figures are denoted by like characters of reference.

The center bar 10 which is equipped with suitably disposed teeth 11 is provided near its front end with a cross piece or strap 12 having terminal apertures 13, said strap being bolted or otherwise secured on the center bar. The latter is provided adjacent to the strap 12 with an eye bolt 14 with which the handles 15 are connected by means of a bolt 16. The handles are connected together by a cross bar or rung 17, which latter is connected with the center bar by means of a vertical brace 18, the lower end of which is bifurcated so as to straddle the center bar with which it is connected by means of a transverse bolt 19 which also serves for the attachment of the lower ends of inclined braces 20, the upper ends of which are connected with the handles adjacent to the ends of the rung 17.

Two wings or side bars 21 are employed, each being provided at its forward end with a strap 22, the inner end of which is formed with a hook 23 engaging one of the terminal eyes or apertures 13 of the strap 12 with which the wings are thus flexibly connected. Each wing is provided near its rear end with an angle plate A, the base of which, 24, is bolted or otherwise secured on the wing, said base being provided at its outer end with an upstanding flange 25, said base and flange being provided, respectively, with apertures 26, 27. For the purpose of connecting the wings with the center bar at the rear end of the latter link braces 28 are provided, each of said braces consisting of an elongated plate or strap having a plurality of apertures or bolt holes 29, each of said braces being provided at its outer end with a hook member 30 engaging the aperture 26 in the base of the angle plates A. A bolt 31 extending vertically through the center bar near the rear end of the latter serves for the attachment of the link braces 28 which are adjustably connected with said bolt by means of one of the series of apertures therein. The vertical brace 18 which connects the center bar with the rung that connects the handles is provided with a series of apertures 32, one of which serves for the passage of a bolt 33. Link braces 34, each having a series of apertures 35 and a terminal hook 36 at the lower end thereof, serve to connect the bolt 33 with the upstanding flanges 25 of the angle plates A. It will be readily seen that by proper adjustment of the bolt 33 with respect to the apertures 32 in the brace member 18 and also with respect to the apertures 35 in the link braces 34, the said link braces may be adjusted according to the distance that the rear ends of the wings are spaced from the center bar by means of the link braces 28, and also that the outer edges of the wings may be tilted either upwardly, as seen in Fig. 6, or downwardly, as seen in Fig. 5, or that a horizontal position of the wings may be preserved.

It is evident that the wings are to be provided with earth engaging teeth 11 similar to the teeth of the center bar, said teeth being arranged and mounted in any suitable, convenient and well known manner.

It will be seen from the foregoing description that the improved harrow may be expanded or collapsed according to the nature of the work that is to be performed, rendering the device extremely convenient for work in orchards or other places where many trees or other obstructions are encountered.

It will also be seen by tilting the wings one way or another the harrow will adapt itself particularly for operation either on ridges or depressions in the ground, the sides of such ridge or ditch being equally and efficiently operated upon.

Having thus described the invention, what is claimed as new, is:—

1. A harrow comprising a center bar, wings hingedly connected at their front ends with said center bar, a brace extending upwardly from the center bar near the rear end thereof, said brace having a series of apertures, and angle plates on the wings near the rear ends thereof, said angle plates having terminal apertures in their bases and in their upstanding flanges, link braces having terminal hooks at their lower ends engaging the apertures in the upstanding flanges of the angle plates, said links being provided with series of apertures, a bolt adjustably connecting the apertured link braces with the apertured upstanding brace, and link braces flexibly connecting the rear end of the center bar with the bases of the angle plates at the rear ends of the wings.

2. In a harrow, a center bar and side wings having earth engaging teeth, means for flexibly connecting the front ends of the wings with the center bar, angle plates on the rear ends of the wings, link braces connecting the rear end of the center bar with the bases of the angle plates for lateral adjustment in a horizontal plane, handles connected with the center bar, a rung connecting the handles, a brace connecting the rung with the center bar near the rear end of the latter, and link braces adjustably connecting the vertical brace with the upstanding flanges of the angle plates on the wings to tilt the latter.

In testimony whereof I affix my signature in presence of two witnesses.

WILLIAM J. STOKES.

Witnesses:
J. R. BROWN,
R. P. SLAY.

---

Copies of this patent may be obtained for five cents each, by addressing the "Commissioner of Patents, Washington, D. C."